United States Patent
Voss

(10) Patent No.: US 9,131,023 B2
(45) Date of Patent: Sep. 8, 2015

(54) SYSTEMS AND METHODS FOR ENHANCING MULTIMEDIA EXPERIENCE

(76) Inventor: Allan Voss, Bonita Springs, FL (US)

( * ) Notice: Subject to any disclaimer, the term of this patent is extended or adjusted under 35 U.S.C. 154(b) by 0 days.

(21) Appl. No.: 13/570,797

(22) Filed: Aug. 9, 2012

(65) Prior Publication Data

US 2014/0047135 A1 Feb. 13, 2014

(51) Int. Cl.
| | | |
|---|---|---|
| *G06F 3/00* | (2006.01) | |
| *H04L 29/06* | (2006.01) | |
| *H04N 21/432* | (2011.01) | |
| *H04N 21/436* | (2011.01) | |
| *H04N 21/81* | (2011.01) | |

(52) U.S. Cl.
CPC ............ *H04L 65/4084* (2013.01); *H04L 65/80* (2013.01); *H04N 21/4325* (2013.01); *H04N 21/43615* (2013.01); *H04N 21/8126* (2013.01)

(58) Field of Classification Search
None
See application file for complete search history.

(56) References Cited

U.S. PATENT DOCUMENTS

| | | | | |
|---|---|---|---|---|
| 5,487,167 | A * | 1/1996 | Dinallo et al. ................. | 715/203 |
| 6,290,565 | B1 | 9/2001 | Galyean, III et al. | |
| 6,773,344 | B1 | 8/2004 | Gabai et al. | |
| 6,948,031 | B2 * | 9/2005 | Chilton .......................... | 711/113 |
| 7,303,471 | B2 | 12/2007 | Gilton | |
| 7,870,562 | B1 * | 1/2011 | Hansen-Sturm ............... | 719/314 |
| 8,155,226 | B2 * | 4/2012 | Xin et al. ....................... | 375/260 |
| 2001/0001160 | A1 | 5/2001 | Shoff et al. | |
| 2005/0060420 | A1 * | 3/2005 | Kovacevic ..................... | 709/231 |
| 2006/0251407 | A1 | 11/2006 | Thordarson et al. | |
| 2006/0287054 | A1 | 12/2006 | Walker et al. | |
| 2008/0020365 | A1 | 1/2008 | Shin et al. | |
| 2008/0032790 | A1 | 2/2008 | Zielinski et al. | |
| 2008/0043140 | A1 | 2/2008 | Herpel et al. | |
| 2008/0139080 | A1 | 6/2008 | Zheng | |
| 2009/0213848 | A1 * | 8/2009 | Jeon et al. ...................... | 370/389 |
| 2010/0077119 | A1 * | 3/2010 | Poo ............................... | 710/110 |
| 2010/0088736 | A1 | 4/2010 | Besen | |
| 2011/0009175 | A1 | 1/2011 | Raichman et al. | |
| 2011/0061086 | A1 * | 3/2011 | Huang ........................... | 725/110 |
| 2012/0027100 | A1 | 2/2012 | Park et al. | |

FOREIGN PATENT DOCUMENTS

| | | | |
|---|---|---|---|
| KR | 1020070089146 | A | 8/2007 |
| KR | 1020120012301 | A | 2/2012 |
| KR | 1020120069795 | A | 6/2012 |

\* cited by examiner

*Primary Examiner* — Elias Mamo
(74) *Attorney, Agent, or Firm* — Laurence A. Greenberg; Werner H. Stemer; Ralph E. Locher

(57) ABSTRACT

Systems and methods for enhancing multimedia experience are disclosed. A system includes a multimedia device adapted to obtain a multimedia data stream comprising multimedia data and at least one multimedia enhancement data sequence, and adapted to obtain instructions from a multimedia enhancement data sequence. The system further includes auxiliary devices communicatively coupled to the multimedia device, and adapted to receive the instructions from a multimedia device. The multimedia enhancement data sequences each include a start section, a target section, an instruction section, and an end section. A multimedia device is adapted to send instructions to at least one auxiliary device. A method includes obtaining a multimedia data stream comprising multimedia data and at least one multimedia enhancement data sequence using a multimedia device, obtaining instructions from a multimedia enhancement data sequence, and sending instructions to auxiliary devices communicatively coupled to the multimedia device.

15 Claims, 4 Drawing Sheets

SYSTEMS AND METHODS FOR ENHANCING MULTIMEDIA EXPERIENCE

BACKGROUND

Conventional multimedia systems allow a user to experience multimedia data playback. These systems typically provide a limited range of experience. For example, audiovisual playback systems may provide a user with a multimedia experience consisting solely of audio and video data from a film. Some auxiliary devices that may enhance a user's experience of a multimedia feature, such as ambient lights or robotic animated characters, are known in the art. However, their implementation with conventional multimedia systems is often costly, due to the specific nature of multimedia data streams. These implementations often require external audiovisual mixing processes, or costly stage management systems, unsuitable for home use. Accordingly, systems and methods for enhancing multimedia experience are needed.

SUMMARY

An exemplary embodiment of a system for enhancing multimedia experience may include a multimedia device adapted to obtain a multimedia data stream including multimedia data and at least one multimedia enhancement data sequence, and adapted to obtain a set of instructions from a multimedia enhancement data sequence. The system may further include auxiliary devices communicatively coupled to the multimedia device, and adapted to receive the set of instructions from a multimedia device. The multimedia enhancement data sequences may each include a start section indicating the beginning of the multimedia enhancement data sequence, a target section specifying a target auxiliary device, an instruction section including instruction data for the target auxiliary device, and an end section indicating the end of the multimedia enhancement data sequence. A multimedia device may be adapted to send a set of instructions to at least one auxiliary device.

An exemplary method for enhancing multimedia experience may include obtaining a multimedia data stream including multimedia data and at least one multimedia enhancement data sequence using a multimedia device, obtaining a set of instructions from a multimedia enhancement data sequence, and sending a set of instructions from a multimedia device to at least one auxiliary device communicatively coupled to the multimedia device. The multimedia enhancement data sequences may each include a start section indicating the beginning of the multimedia enhancement data sequence, a target section specifying a target auxiliary device, an instruction section including instruction data for the target auxiliary device, and an end section indicating the end of the multimedia enhancement data sequence.

BRIEF DESCRIPTION OF THE DRAWINGS

The present embodiments are illustrated by way of example and not limitation in the figures of the accompanying drawings, in which like references indicate similar elements.

DETAILED DESCRIPTION

Aspects of the present invention are disclosed in the following description and related figures directed to specific embodiments of the invention. Those skilled in the art will recognize that alternate embodiments may be devised without departing from the spirit or the scope of the claims. Additionally, well-known elements of exemplary embodiments of the invention will not be described in detail or will be omitted so as not to obscure the relevant details of the invention.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Figure 1:
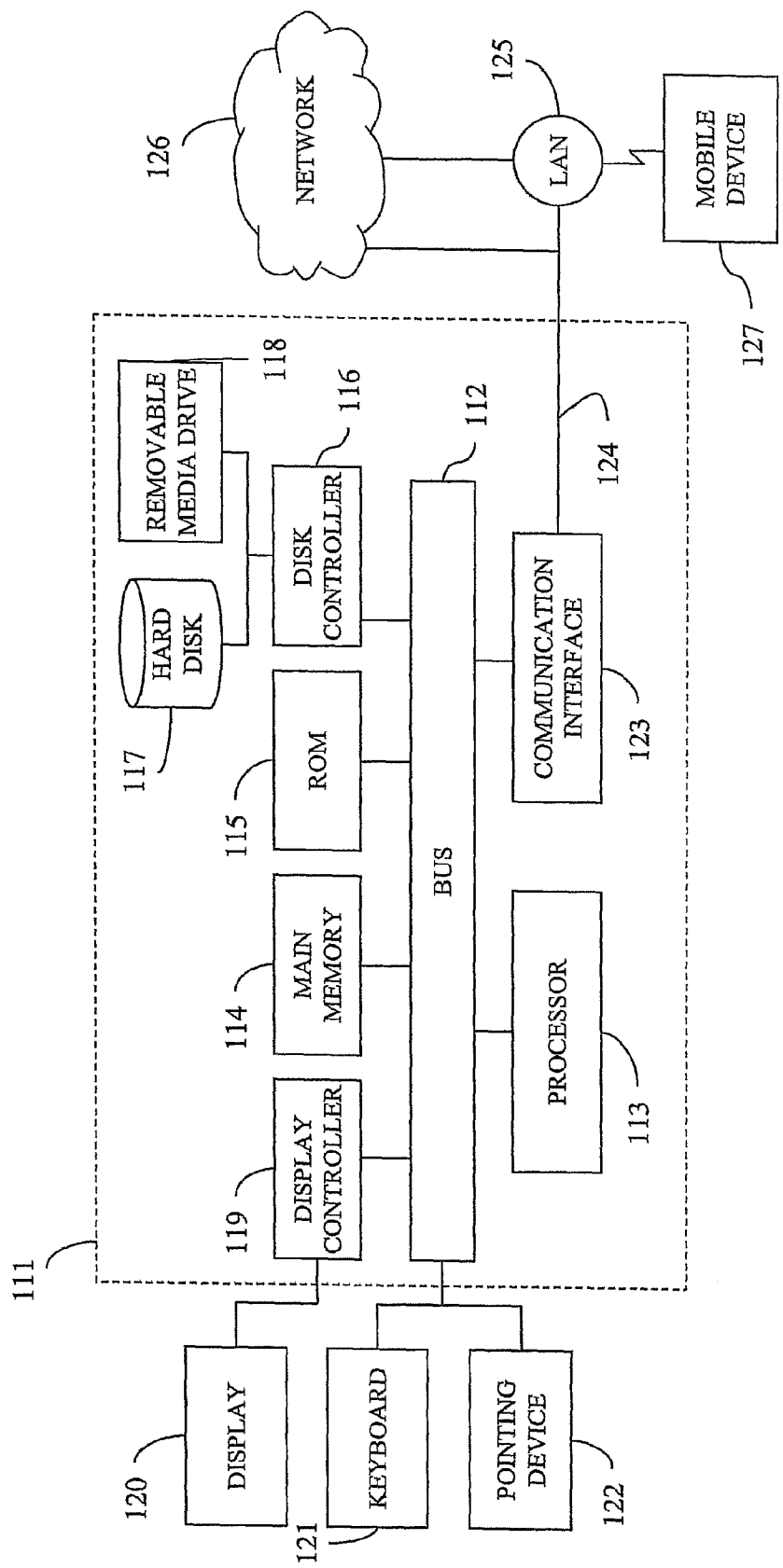
FIG. 1 illustrates an exemplary embodiment of a computer system.
Figure 2A:
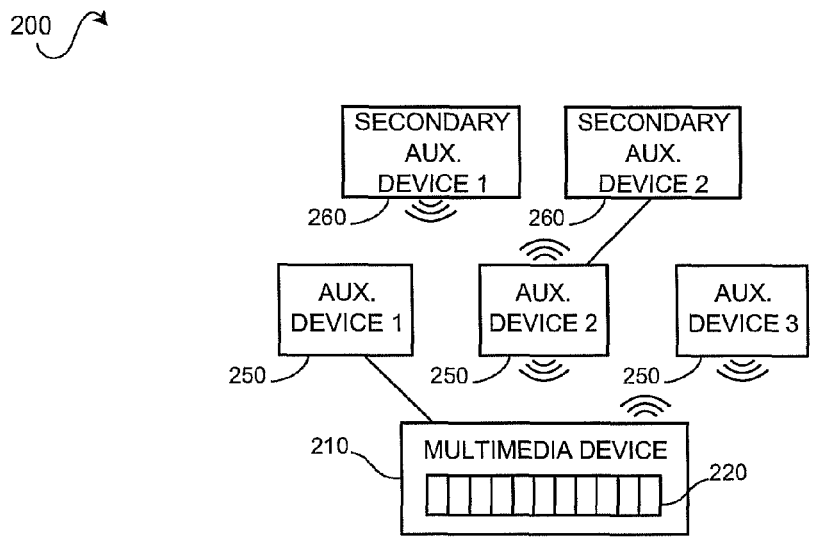
FIG. 2a illustrates an exemplary embodiment of a system for enhancing multimedia experience.
Figure 2B:
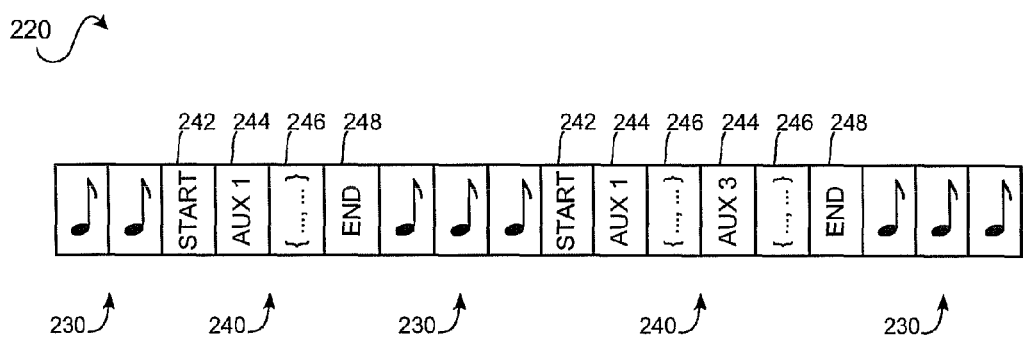
FIG. 2b illustrates an exemplary embodiment of a multimedia data stream.
Figure 3:
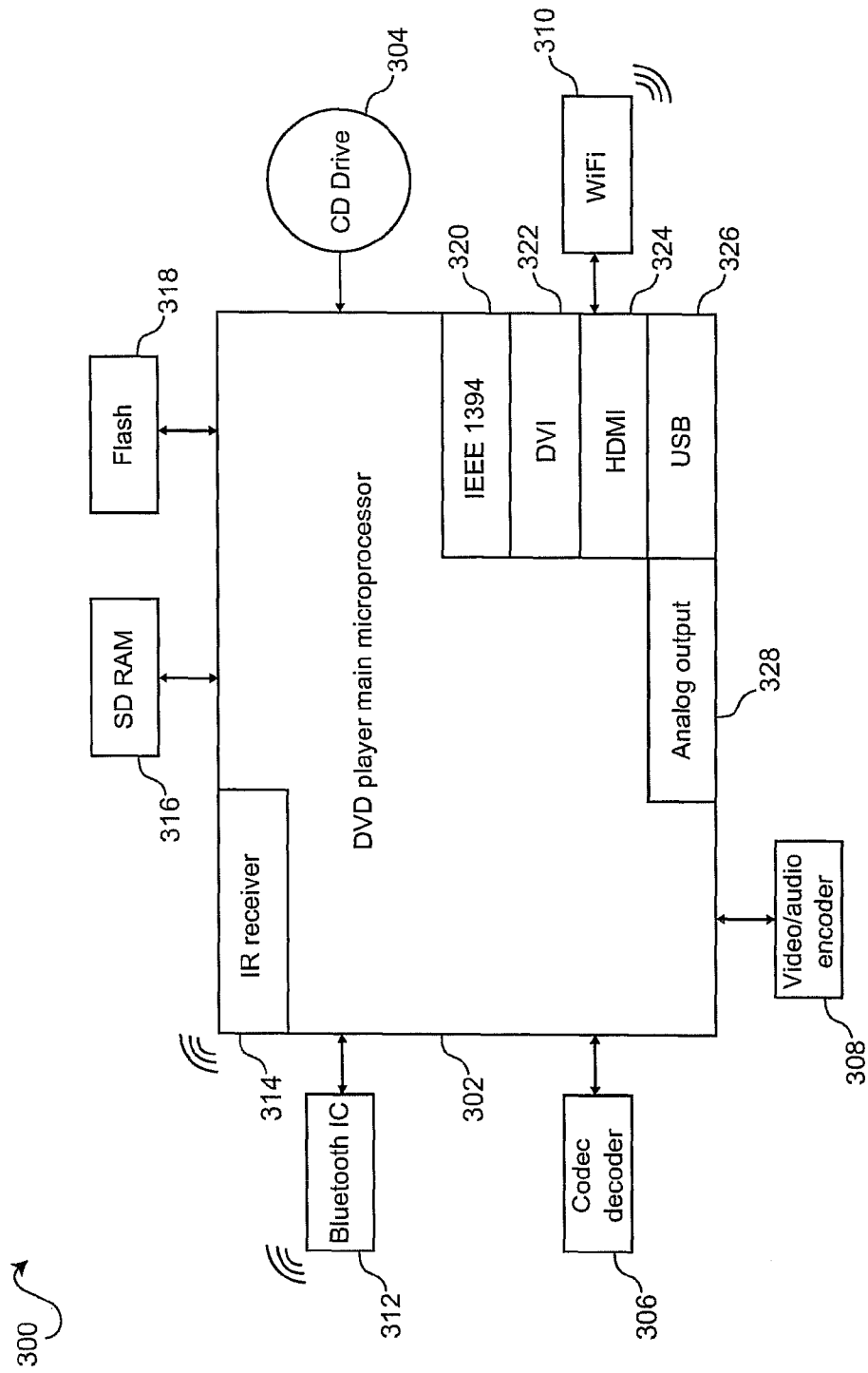
FIG. 3 illustrates a hardware block diagram of an exemplary embodiment of a multimedia device.

Referring generally to FIGS. 1-3, embodiments disclosed herein describe systems and methods for enhancing multimedia experience. In exemplary embodiments, any number of auxiliary devices connected by wire or wirelessly, locally or over a network, may be activated or operated according to instructions in a multimedia data stream. Exemplary embodiments may enhance a user's multimedia experience, using auxiliary devices that may, for example, perform functions synchronized with multimedia playback.

FIG. 1 illustrates a computer system 111 upon which an embodiment of the present invention may be implemented. The computer system 111 may include a bus 112 or other communication mechanism for communicating information, and a processor 113 coupled with the bus 112 for processing the information. The computer system 111 also may include a main memory 114, such as a random access memory (RAM) or other dynamic storage device (e.g., dynamic RAM (DRAM), static RAM (SRAM), and synchronous DRAM (SDRAM)), coupled to the bus 112 for storing information and instructions to be executed by processor 113. In addition, the main memory 114 may be used for storing temporary variables or other intermediate information during the execution of instructions by the processor 113. The computer system 111 may further include a read only memory (ROM) 115 or other static storage device (e.g., programmable ROM (PROM), erasable PROM (EPROM), and electrically erasable PROM (EEPROM)) coupled to the bus 112 for storing static information and instructions for the processor 113.

The computer system 111 may also include a disk controller 116 coupled to the bus 112 to control one or more storage devices for storing information and instructions, such as a magnetic hard disk 117, and a removable media drive 118 (e.g., floppy disk drive, flash memory drive, read-only compact disc drive, read/write compact disc drive, compact disc jukebox, tape drive, and removable magneto-optical drive). The storage devices may be added to the computer system 111 using an appropriate device interface, including, for example, a small computer system interface (SCSI), integrated device electronics (IDE), enhanced-IDE (E-IDE), direct memory access (DMA), ultra-DMA, a serial port connection, a parallel port connection, USB, IEEE 1394 (FireWire), Bluetooth, Wi-Fi, or any other type of connection or interface known in the art.

The computer system 111 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 111 may also include a display controller 119 coupled to the bus 112 to control a display 120, such as a cathode ray tube (CRT), liquid crystal display (LCD) or any other type of display, for displaying information to a computer user. The computer system may include input devices, such as a keyboard 121 and a pointing device 122, for interacting with a computer user and providing information to the processor 113. Additionally, a touch screen could be employed in conjunction with display 120. The pointing device 122, for example, may be a mouse, a trackball, or a pointing stick for communicating direction information and command selections to the processor 113 and for controlling cursor movement on the display 120. In addition, a printer may provide printed listings of data stored and/or generated by the computer system 111.

The computer system 111 may perform a portion or all of the processing steps of exemplary embodiments of the invention in response to the processor 113 executing one or more sequences of one or more instructions contained in a memory, such as the main memory 114. Such instructions may be read into the main memory 114 from another computer-readable medium, such as a hard disk 117 or a removable media drive 118. One or more processors in a multi-processing arrangement may also be employed to execute the sequences of instructions contained in main memory 114. In alternative embodiments, hard-wired circuitry may be used in place of or in combination with software instructions. Thus, embodiments are not limited to any specific combination of hardware circuitry and software.

As stated above, the computer system 111 may include at least one computer-readable medium or memory for holding instructions programmed according to the teachings of exemplary embodiments of the invention and for containing data structures, tables, records, or other data described herein. Examples of computer-readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer-readable media, exemplary embodiments of the present invention may include software for controlling the computer system 111, for driving a device or devices for implementing exemplary embodiments of the invention, and for enabling the computer system 111 to interact with a human user. Such software may include, but is not limited to, device drivers, operating systems, development tools, and applications software. Such computer-readable media may further include the computer program product of exemplary embodiments of the present invention for performing all or a portion (if processing is distributed) of the processing performed in implementing exemplary embodiments of the invention.

The computer code devices of exemplary embodiments of the present invention may be any interpretable or executable code mechanism, including but not limited to scripts, interpretable programs, dynamic link libraries (DLLs), Java classes, and complete executable programs. Moreover, parts of the processing of exemplary embodiments of the present invention may be distributed for better performance, reliability, and/or cost.

The term "computer-readable medium" as used herein refers to any medium that may participate in providing instructions to the processor 113 for execution. A computer-readable medium may take many forms, including but not limited to, non-volatile media, volatile media, and transmission media. Non-volatile media includes, for example, optical, magnetic disks, and magneto-optical disks, such as the hard disk 117 or the removable media drive 118. Volatile media may include dynamic memory, such as the main memory 114. Transmission media may include coaxial cables, copper wire and fiber optics, including the wires that make up the bus 112. Transmission media also may also take the form of acoustic or light waves, such as those generated during radio wave and infrared data communications. Transmission may be accomplished using, for example, a serial port connection, a parallel port connection, USB, IEEE 1394 (FireWire), Bluetooth, Wi-Fi, or any other type of connection or interface known in the art.

Various forms of computer-readable media may be involved in carrying out one or more sequences of one or more instructions to processor 113 for execution. For example, the instructions may initially be carried on a magnetic disk of a remote computer. The remote computer can load the instructions for implementing all or a portion of exemplary embodiments of the present invention remotely into a dynamic memory and send the instructions over a telephone line using a modem. A modem local to the computer system 111 may receive the data on the telephone line and use an infrared transmitter to convert the data to an infrared signal. An infrared detector coupled to the bus 112 can receive the data carried in the infrared signal and place the data on the bus 112. The bus 112 may carry the data to the main memory 114, from which the processor 113 may retrieve and execute the instructions. The instructions received by the main memory 114 may optionally be stored on storage device 117 or 118 either before or after execution by processor 113.

The computer system 111 may also include a communication interface 123 coupled to the bus 112. The communication interface 123 may provide a two-way data communication coupling to a network link 124 that may be connected to, for example, a local area network (LAN) 125, or to another communications network 126 such as the Internet. For example, the communication interface 123 may be a network interface card to attach to any packet switched LAN. As another example, the communication interface 123 may be an asymmetrical digital subscriber line (ADSL) card, an integrated services digital network (ISDN) card or a modem to provide a data communication connection to a corresponding type of communications line. Wireless links, using, for example, Wi-Fi or Bluetooth, may also be implemented. In any such implementation, the communication interface 123 may send and receive electrical, electromagnetic or optical signals that may carry digital data streams representing various types of information.

The network link 124 typically may provide data communication through one or more networks to other data devices. For example, the network link 124 may provide a connection to another computer or remotely located presentation device through a local network 125 (e.g., a LAN) or through equipment operated by a service provider, which may provide communication services through a communications network 126. In preferred embodiments, the local network 124 and the communications network 126 preferably use electrical, electromagnetic, or optical signals that carry digital data streams. The signals through the various networks and the signals on the network link 124 and through the communication interface 123, which carry the digital data to and from the computer system 111, are exemplary forms of carrier waves transporting the information. The computer system 111 can transmit and receive data, including program code, through the network(s) 125 and 126, the network link 124 and the communication interface 123. Moreover, the network link 124 may provide a connection through a LAN 125 to a mobile device 127 such as a personal digital assistant (PDA) laptop computer, or cellular telephone. The LAN communications network 125 and the communications network 126 both use electrical, electromagnetic or optical signals that carry digital data streams. The signals through the various networks and the signals on the network link 124 and through the communication interface 123, which carry the digital data to and from the system 111, are exemplary forms of carrier waves transporting the information. The processor system 111 can transmit notifications and receive data, including program code, through the network(s), the network link 124 and the communication interface 123.

Other aspects of exemplary embodiments of the invention may include data transmission and Internet-related activities. See Preston Gralla, How the Internet Works, Ziff-Davis Press (1996), which is hereby incorporated by reference into this patent application. Still other aspects of exemplary embodiments of the invention may utilize wireless data transmission, such as those described in U.S. Pat. Nos. 6,456,645, 5,818,328 and/or 6,208,445, all of which are hereby incorporated by reference into this patent application.

FIG. 2a shows an exemplary embodiment 200 of a system for enhancing multimedia experience, which may include at least one multimedia device 210, and at least one auxiliary device 250. An auxiliary device 250 may be communicatively coupled to a multimedia device 210 by wire or wirelessly, locally or over a network. A system for enhancing multimedia experience may further include at least one secondary auxiliary device 260, which may be communicatively coupled to an auxiliary device 250 by wire or wirelessly, locally or over a network. A multimedia device 210 may be adapted to obtain a multimedia data stream 220.

FIG. 2b shows an exemplary multimedia data stream 220, which may include multimedia data 230 and at least one multimedia enhancement data sequence 240. The multimedia data 230 may be digital data, analog film data, RAW protocol data, RAW binary data, and/or any type of multimedia data known in the art. The multimedia data 230 may include text data, audio data, still images data, animation data, video data, interactivity data (such as, for example, data for a video game), and/or any other multimedia data known in the art. A multimedia enhancement data sequence 240 may include instructions for at least one auxiliary device 250. A multimedia enhancement data sequence 240 may be non-intrusive to the multimedia data 230, so as not to disrupt the multimedia data reading and/or interpretation, and to facilitate compatibility with conventional media players. For example, a video codec protocol may include data slots available for the insertion of a sub-stream, without interference with video playback.

A multimedia enhancement data sequence 240 may include a start section 242 indicating the beginning of the multimedia enhancement data sequence 240. A multimedia enhancement data sequence 240 may further contain a target section 244 specifying a target auxiliary device, and an instruction section 246 containing instruction data for the target auxiliary device. A multimedia enhancement data sequence 240 may further contain an end section 248 indicating the end of the multimedia enhancement data sequence 240. A multimedia enhancement data sequence 240 may contain multiple target sections 244 and/or instruction sections 246. Alternatively, an instruction section 246 may contain subsections containing instructions for at least one secondary auxiliary device 260. A data type of a multimedia enhancement data sequence 240 may be the same as or different from a data type of multimedia data 230.

A multimedia device 210 may be further adapted to obtain at least one multimedia enhancement data sequence 240 from a multimedia data stream 220. A multimedia device 210 may include, for example, a device adapted to stream audio and/or video. A multimedia device 210 may include, for example, a personal computer, a tablet computer, a mobile phone, a PDA, a video game console, an optical disc player, a set-top-box, an audio-video receiver, a network-adapted streaming device, a network-adapted media player, or any other multimedia device in the art. For example, a multimedia device 210 may include a DVD player, and a multimedia data stream 220 may be burned on a DVD.

In the process of obtaining the multimedia data stream 220, and upon obtaining a start section 242, the multimedia device 210 may begin obtaining a multimedia enhancement data sequence 240. Upon obtaining an end section 248, the multimedia device 210 may finish obtaining a multimedia enhancement data sequence 240. The multimedia enhancement data sequence 240, or a portion of the multimedia enhancement data sequence 240, may be stored on a computer-readable media of the multimedia device 210, and/or processed by a processor of the multimedia device 210.

A set of instructions may be obtained or derived from instruction data in an instruction section 246. For example, instruction data may be a copied to a computer-readable media to produce a set of instructions. Alternatively, instruction data may be decoded by a decoder included in the multimedia device 210. A set of instructions may include one or more instructions.

A multimedia device 210 may be further adapted to send a set of instructions to a target auxiliary device. Alternatively, multiple sets of instructions may be queued and sent at once, according to data transmission methods known in the art.

An auxiliary device 250 may include a lighting device, a robotic system such as an animated figure or a motored apparatus, an electronic sign, a home lighting system, any mechanical or electronic device for multimedia experience known in the art, and/or any multimedia device known in the art. For example, an auxiliary device 250 may include an animated figure adapted to sing along or be otherwise animated in sequence with an audiovisual multimedia data stream played by a multimedia device 210, throughout the video or only during specific scenes.

An auxiliary device 250 may be adapted to receive a set of instructions from a multimedia device 210, by wire or wirelessly. The auxiliary device 250 may be further adapted to interpret the set of instructions using any interpretation method known in the art. The auxiliary device 250 may be adapted to perform a function according to the set of instructions. For example, a set of lights may be instructed to vary intensity or hue according to specific scenes in a film.

Alternatively, an auxiliary device 250 may be adapted to send a secondary set of instructions to at least one secondary auxiliary device 260, by wire or wirelessly, locally or over a network. A secondary auxiliary device 260 may have substantially the same features as an exemplary auxiliary device 250 described above.

Alternatively, an auxiliary device 250 may contain a set of preset instructions, to minimize the size of a set of instructions received from a multimedia device 210. An auxiliary device 250 may be further adapted to send feedback data to a multimedia device 210, for example acknowledging receipt of a set of instructions. This may improve the efficiency of data flow. Feedback data may alternatively include, for example, battery status or signal status.

FIG. 3 shows an exemplary embodiment 300 of a multimedia device, which may include a main microprocessor 302, an optical drive 304, a codec decoder 306, a video/audio encoder 308, a Wi-Fi device 310, a Bluetooth device 312, an infrared device 314, SD RAM 316, flash memory 318, an IEEE 1394 port 320, a DVI port 322, an HDMI port 324, a USB port 326, and an analog video output port 328.

The optical drive 304 may include, for example, a CD-ROM drive, a DVD-ROM drive, a Blu-ray drive, or any other optical drive known in the art. The codec decoder 306 may include, for example, a proprietary codec decoder to decipher commands embedded in a multimedia data stream to control auxiliary devices, or any other codec decoder known in the art. The Wi-Fi device may include, for example, a Wi-Fi 802.11b device, or any other Wi-Fi device known in the art.

Figure 4:
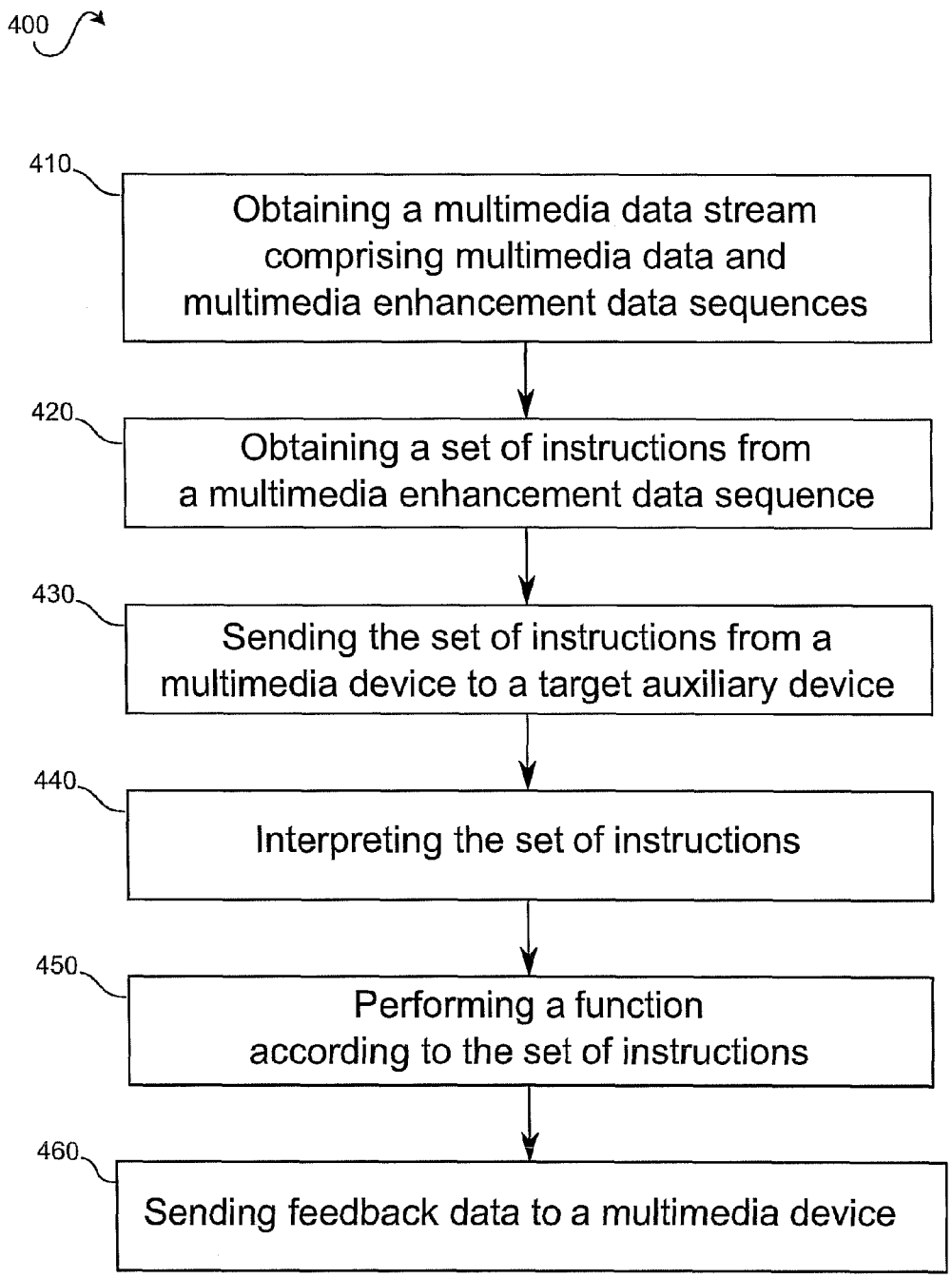
FIG. 4 illustrates an exemplary method for enhancing multimedia experience.

FIG. 4 shows an exemplary method 400 for enhancing multimedia experience, which may include obtaining a multimedia data stream including multimedia data and at least one multimedia enhancement data sequence at step 410, obtaining a set of instructions from at least one multimedia enhancement data sequence at step 420, sending the set of instructions from a multimedia device to at least one target auxiliary device communicatively coupled to a multimedia device at step 430, interpreting the set of instructions at step 440, performing a function according to the set of instructions at step 450, and sending feedback data to a multimedia device at step 460.

At step 420, obtaining a set of instructions from at least one multimedia enhancement data sequence may include obtaining at least one multimedia enhancement data sequence from one of the multimedia data streams. Further, obtaining a multimedia enhancement data sequence may include: beginning to obtain a multimedia enhancement data sequence upon obtaining a start section from the multimedia data stream, and finishing to obtain the multimedia enhancement data sequence upon obtaining an end section from the multimedia data stream. Furthermore, obtaining a set of instructions may include obtaining and/or decoding an instruction section.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A system for enhancing multimedia experience, comprising:
   at least one multimedia device configured to obtain a multimedia data stream comprising multimedia data and at least one multimedia enhancement data sequence inserted as a sub-stream within the multimedia data stream, and configured to obtain at least one instruction from the at least one multimedia enhancement data sequence; and
   at least one auxiliary device local to, and communicatively coupled to, the at least one multimedia device, and configured to receive the at least one instruction from at least one of the at least one multimedia device, said at least one auxiliary device having stored therein a set of preset instructions for performing a function;
   wherein the at least one multimedia device is configured to send the at least one instruction to the at least one auxiliary device without disrupting a reading or interpretation of the multimedia data stream by the at least one multimedia device;
   wherein, in response to the receipt of said at least one instruction, the at least one auxiliary device is further configured to execute at least a portion of said set of preset instructions in order to perform the function of the at least one auxiliary device according to the set of preset instructions; and
   wherein the at least one auxiliary device includes at least one of a home lighting device or system, a robotic system, an animated figure, a motored apparatus, an electronic sign, and a mechanical device.

2. The system for enhancing multimedia experience of claim 1, wherein the multimedia data comprises at least one of binary data, text data, audio data, still images data, animation data, video data and interactivity data.

3. The system for enhancing multimedia experience of claim 1, wherein the at least one multimedia device is further configured to obtain the at least one multimedia enhancement data sequence from one of the at least one multimedia data stream.

4. The system for enhancing multimedia experience of claim 1,
   wherein the at least one multimedia device is configured to begin obtaining the at least one multimedia enhancement data sequence upon obtaining a start section from the one of the at least one multimedia data stream, and
   wherein the at least one multimedia device is configured to finish obtaining the at least one multimedia enhancement data sequence upon obtaining an end section from the one of the at least one multimedia data stream.

5. The system for enhancing multimedia experience of claim 1, wherein the at least one multimedia device is further configured to obtain a set of instructions from instruction data in at least one instruction section from the one of the at least one multimedia data stream.

6. The system for enhancing multimedia experience of claim 5, wherein the at least one multimedia device is further configured to decode instruction data in the at least one instruction section to obtain a set of instructions for at least one of the at least one target auxiliary device.

7. The system for enhancing multimedia experience of claim 1, wherein the at least one multimedia device comprises at least one of a main microprocessor, an optical drive, a codec decoder, a video/audio encoder, a Wi-Fi device, a Bluetooth device, an infrared device, SD RAM, flash memory, an IEEE 1394 port, a DVI port, an HDMI port, a USB port, and an analog video output port.

8. The system for enhancing multimedia experience of claim 1, wherein the at least one auxiliary device is further configured to send feedback data to at least one of the at least one multimedia device.

9. The system for enhancing multimedia experience of claim 1, further comprising at least one secondary auxiliary device communicatively coupled to at least one of the at least one auxiliary device and configured to receive a set of instructions from at least one of the at least one auxiliary device, wherein at least one of the at least one auxiliary device is further configured to send at least one secondary set of instructions to the at least one secondary auxiliary device.

10. A method for enhancing multimedia experience, comprising:

obtaining a multimedia data stream from a nontransitory memory device including multimedia data and at least one multimedia enhancement data sequence inserted as a sub-stream within the multimedia data using at least one multimedia device;

obtaining a set of instructions from the at least one multimedia enhancement data sequence; and sending the set of instructions from the at least one multimedia device to at least one auxiliary device local to, and communicatively coupled to, the at least one multimedia device without disrupting a reading or interpretation of the multimedia data stream by the at least one multimedia device;

interpreting the set of instructions using the at least one auxiliary device;

the at least one auxiliary device performing a function according to the interpreted set of instructions; and the at least one auxiliary device including at least one of a home lighting device or system, a robotic system, an animated figure, a motored apparatus, an electronic sign, and a mechanical device.

11. The method for enhancing multimedia experience of claim 10, wherein the multimedia data comprises at least one of binary data, text data, audio data, still images data, animation data, video data and interactivity data.

12. The method for enhancing multimedia experience of claim 10, wherein obtaining a set of instructions from the at least one multimedia enhancement data sequence comprises obtaining at least one multimedia enhancement data sequence from one of the at least one multimedia data stream.

13. The method for enhancing multimedia experience of claim 10, wherein obtaining at least one multimedia enhancement data sequence comprises:

beginning to obtain the at least one multimedia enhancement data sequence upon obtaining a start section from the one of the at least one multimedia data stream, and finishing to obtain the at least one multimedia enhancement data sequence upon obtaining an end section from the one of the at least one multimedia data stream.

14. The method for enhancing multimedia experience of claim 10, wherein obtaining a set of instructions from the at least one multimedia enhancement data sequence comprises at least one of obtaining and decoding the at least one instruction section.

15. The method for enhancing multimedia experience of claim 10, further comprising sending feedback data to at least one of the at least one multimedia device using the at least one auxiliary device.

* * * * *